(12) United States Patent
Yoked

(10) Patent No.: US 9,375,742 B1
(45) Date of Patent: Jun. 28, 2016

(54) MOTORIZED HYDRATION SYSTEM

(71) Applicant: Yehuda Yoked, Park City, UT (US)

(72) Inventor: Yehuda Yoked, Park City, UT (US)

( * ) Notice: Subject to any disclaimer, the term of this patent is extended or adjusted under 35 U.S.C. 154(b) by 0 days.

(21) Appl. No.: 14/459,989

(22) Filed: Aug. 14, 2014

Related U.S. Application Data

(60) Provisional application No. 61/984,072, filed on Apr. 25, 2014.

(51) Int. Cl.
*B05B 11/00* (2006.01)

(52) U.S. Cl.
CPC .......... *B05B 11/3081* (2013.01); *B05B 11/0089* (2013.01); *B05B 11/3052* (2013.01)

(58) Field of Classification Search
CPC ............ B05B 11/3081; B05B 11/3052; B05B 11/0089
USPC .............. 222/527, 464.1, 382, 333, 175, 608, 222/610
See application file for complete search history.

(56) References Cited

U.S. PATENT DOCUMENTS

| | | | | |
|---|---|---|---|---|
| 4,095,812 A * | 6/1978 | Rowe | ........................ | B62J 11/00 222/175 |
| 5,201,442 A * | 4/1993 | Bakalian | .................. | B62J 11/00 222/608 |
| 5,326,124 A * | 7/1994 | Allemang | ................. | B62J 11/00 222/610 |
| 5,645,404 A | 7/1997 | Zelenak | | |
| 7,007,502 B2 | 3/2006 | Kreutzmann et al. | | |
| 8,136,702 B2 | 3/2012 | Skillern et al. | | |
| 8,220,664 B1 | 7/2012 | Teetzel et al. | | |
| 8,540,122 B2 | 9/2013 | Skillern et al. | | |
| 2001/0030201 A1 * | 10/2001 | Gerhardt | .............. | B67D 1/0004 222/333 |
| 2004/0045980 A1 | 3/2004 | Robins | | |
| 2006/0021999 A1 * | 2/2006 | Jonjic | .................. | B67D 1/0425 222/333 |
| 2006/0208005 A1 * | 9/2006 | Sweeton | ............... | B05B 9/0861 222/333 |
| 2007/0164037 A1 | 7/2007 | Chen | | |
| 2009/0179046 A1 | 7/2009 | Reichert et al. | | |

* cited by examiner

*Primary Examiner* — Donnell Long
(74) *Attorney, Agent, or Firm* — Davidoff Hutcher & Citron LLP; David H. Siegel

(57) ABSTRACT

The motorized hydration kit provides motorized unpressurized hydration to persons riding bicycles and/or persons using waist or back packs while driving, walking, running and hiking. A miniature light weight vane and/or peristaltic and/or diaphragm liquid pumps powered by a rechargeable direct current power source are built into a proprietary water bottle cap assembly that will replace most caps of water bottles type in the market. Same cap along with two tubing fittings will allow a simple and quick modification of most types of hydration bladders used in waist or back packs in the market. A programmable pump power control module will allow users to draw liquid and liquefied food additives from water bottles or water bladders and proprietary food additive capsules/containers on demand.

20 Claims, 3 Drawing Sheets

MOTORIZED HYDRATION SYSTEM

PRIOR APPLICATIONS

This application claims the benefit of U.S. Provisional Application No. 61/984,072, filed Apr. 25, 2014.

FIELD OF THE INVENTION

The present invention relates to unpressurized and pressurized personal hydration systems such as those installed and/or used on bicycles and/or other vehicles or carried and/or donned by persons while cycling, hiking, driving or conducting other activities.

BACKGROUND OF THE INVENTION

Water bottles and unpressurized bladders are commonly used by cyclists, hikers, drivers and others during outdoor or indoor activities. They provide a valuable source of hydration to persons involved in such activities. Drawing hydration from water bottles through tubes with bite valves while cycling, walking, running or driving may cause stumbling, accidents and/or other damage.

In the past decade, certain pressurized hydration systems have been introduced into the market. These have improved the ability to draw hydration as long as a minimum required pressure is available. Some pressurized hydration systems use handheld air pumps to supply pressure while others use pressurized canisters to provide pressure.

Such hydration systems provide either water or a mixture of water and food additives (enhanced hydration) in the bottle or bladder. Having enhanced hydration in such containers requires frequent cleaning and rinsing of the bottles and/or bladders as well as other hydration system components including caps, bite valves and tubes to clear gummy residues that food/hydration additives leave.

U.S. Pat. No. 8,540,122, which is a continuation-in-part of U.S. patent application Ser. No. 11/764,620, which issued as U.S. Pat. No. 8,136,702, discloses a hydration system that is activated by a gas that exerts pressure, wherein baffles are used to regulate the flow of pressure. In this manner, the rate of release of the hydration substance stored in the bladder is controlled.

U.S. patent application Ser. No. 12/270,787, which is a continuation-in-part of U.S. patent application Ser. No. 11/497,672, discloses a pressurized fluid delivery system that reduces the need for repressurizing the flexible bladder because pressure from a pressurizable sleeve can provide an applied force against the flexible bladder even as the bladder is emptied.

U.S. Pat. No. 7,703,633 discloses a mouthpiece assembly of a water bottle wherein the seal member is moved when the user squeezes the mouthpiece. Other hydration systems are shown at http://bluedesert.co.il and http://www.geigerri-g.com.

SUMMARY OF THE INVENTION

At least one embodiment of the current invention provides a motorized hydration system that does not require gas canisters or hand-pumping. A user of the current invention receives on-demand hydration from a bottle, bladder or other container by activating the system.

At least one embodiment of the current invention further provides a kit that allows users to preserve a major part of their existing hydration systems whether unpressurized or pressurized. The kit, easily installed by the user, modifies existing products and allows for motorized (powered) on-demand hydration and enhanced hydration.

The invention also includes a method for installing a kit in conformance with the invention into an existing hydration system.

BRIEF DESCRIPTION OF THE DRAWINGS

For a more complete understanding of the present invention, reference may be had to the following detailed description of the invention taken in conjunction with the drawings herein, of which.

DETAILED DESCRIPTION OF THE INVENTION

Figures 1, 2:
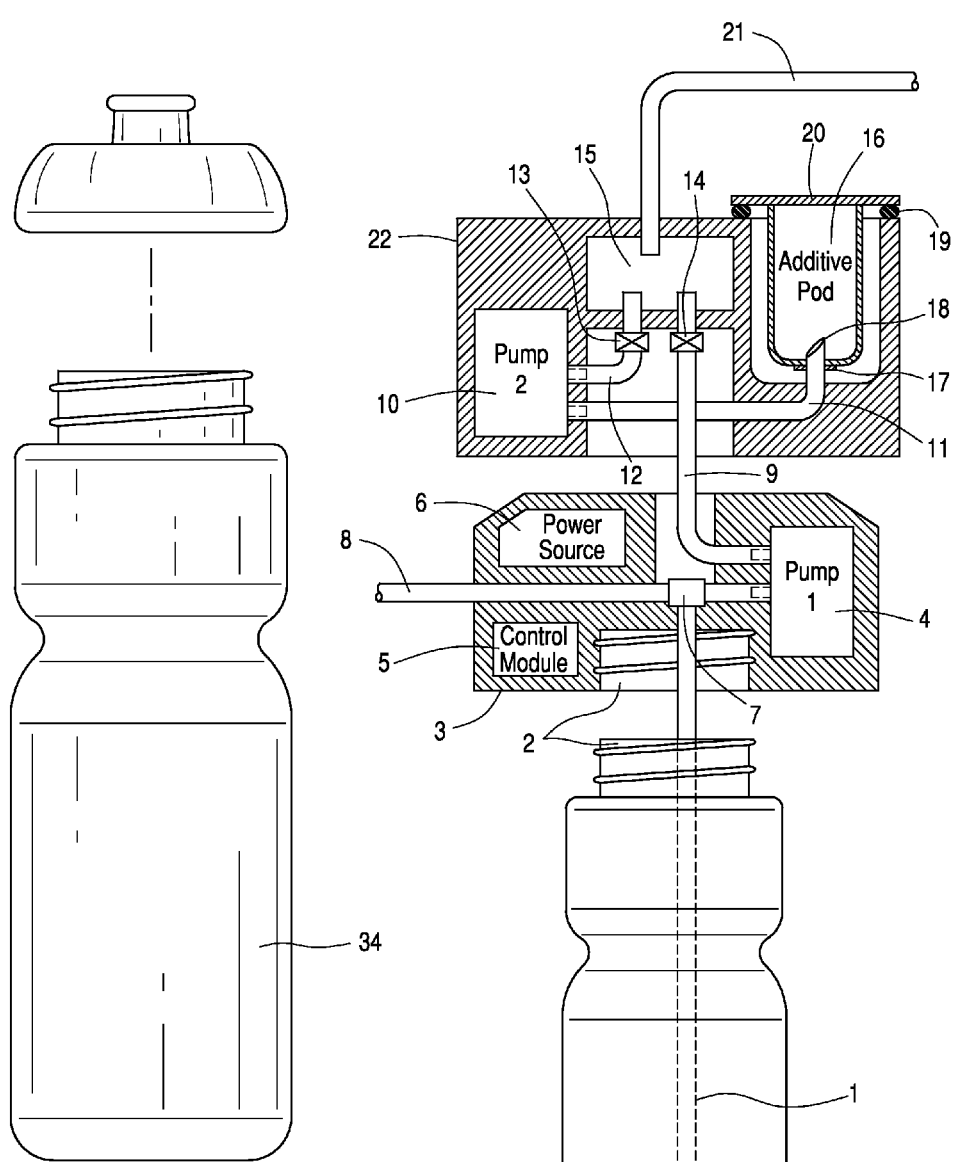
FIG. 1 is a prior art water bottle
FIG. 2 is a section view of a bicycle motorized hydration kit as used in accordance with the invention.

Referring to the accompanying drawings wherein like reference numbers refer to the same or similar elements, a motorized hydration system is shown in FIG. 2 and typically comprises a pump assembly (3) that may be in the form of a passive cap for a container for holding liquids and may include an additional food/hydration additives pod housing assembly (22). Pump assembly (3) and food/hydration additives pod housing assembly (22) each include a respective housing, the material of which and construction of which are readily ascertainable by those skilled in the art to which this invention pertains in view of the disclosure herein.

A power source, for example, a DC rechargeable or non-rechargeable power source (6), is included in the pump assembly (3) and is connected through wires to a lightweight micro or miniature vane or diaphragm motorized pump (4) that is installed into the pump assembly (3) and to a micro peristaltic motorized pump (10) that is installed in the food/hydration additives pod housing assembly (22), both pumps are controlled by a control module (5) installed in the pump assembly (3). The micro or miniature vane or diaphragm motorized pump (4) may be fitted in the pump assembly (3) if the container will contain water, flavored water or when the user will mix water with additives in the container since it is designed to handle food and hydration additives which can cause gumming of moving parts. The micro vane or diaphragm motorized pump (4) may be fitted in the pump assembly (3) if the bottle will contain water only, i.e., without food-type additives. That is, the micro vane or diaphragm motorized pump (4) is designed to handle water and lightly-enriched water products including, without restriction, Gatorade and Vitamin Water.

In a two-container embodiment, an electronically controlled diverter (7) is controlled by the control module (5). In a one-bottle embodiment, the diverter (7) may be included but not activated.

A single use concentrated food/hydration additive pod (16), providing a variety of food and/or hydration additives such as electrolytes, sugar, salt etc. as selected by the user, is inserted into the food/hydration additives pod housing assembly (22) and pumped by the micro peristaltic motorized pump (10) into a mixing chamber (15) where it is mixed with the liquid contained in the container(s); consequently providing the final mix to the user through a first output tube (21) in flow communication with the mixing chamber (15). The first output tube (21) may be attached to the handlebars of a bicycle or held in the user's mouth.

Figure 3:
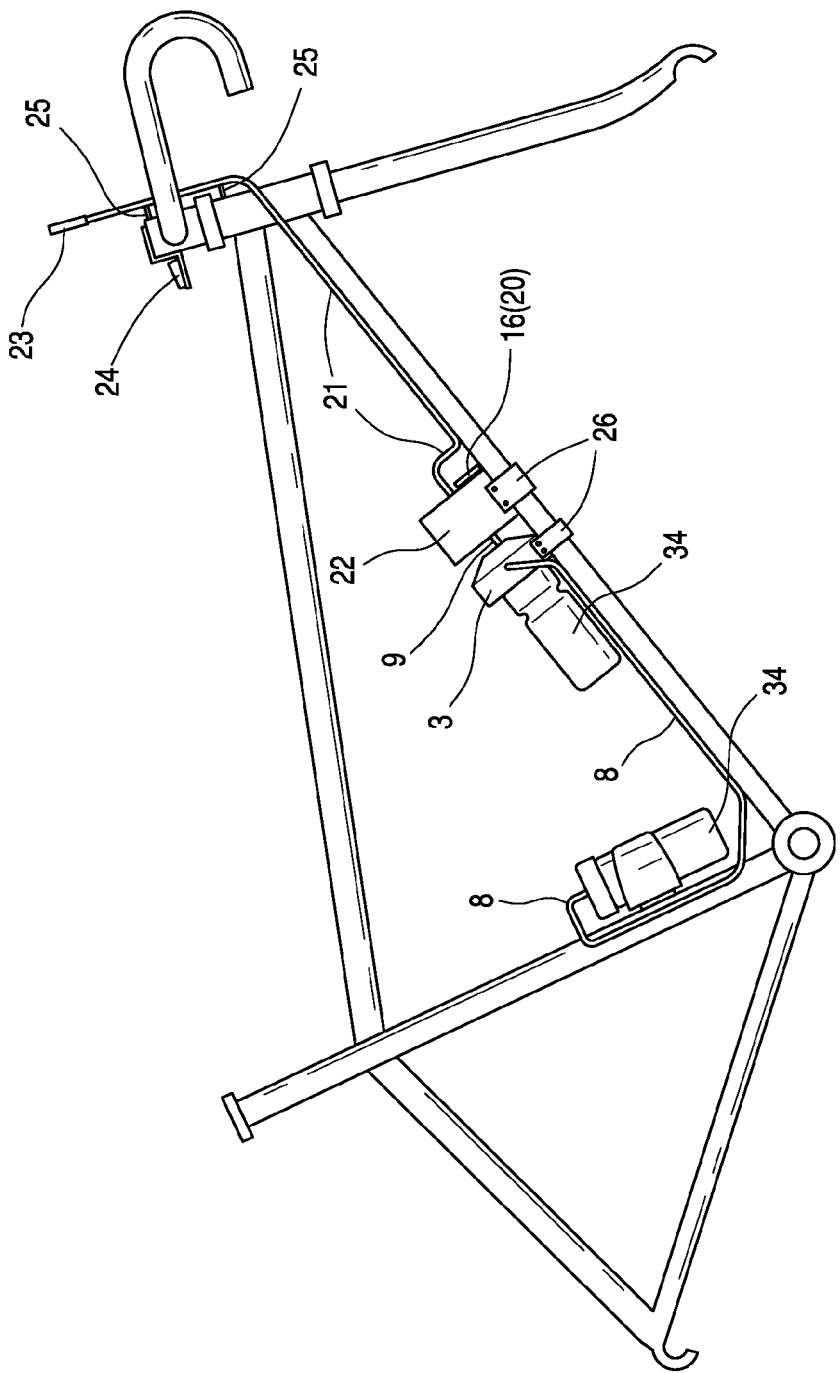
FIG. 3 is an embodiment of the motorized hydration embodiment of the invention shown installed on a bicycle.

FIG. 3 shows the placement of the bicycle motorized system in accordance with the invention comprising two bottles, a first suction tube (1), an optional second suction tube (8), a first output tube (21), a second output tube (9), pump assembly (3) and food/hydration additives pod housing assembly (22), bite valve (23) and user remote control (24). The user remote control (24) may also be integrated into a phone or smart phone as an application. The suction tube (1), (8) lead from a respective bottle or bladder (34) to the diverter valve (7), from which there is an internal tubing to the micro vane or diaphragm motorized pump (4), see FIG. 2. The second output tube (9) leads from the micro vane or diaphragm motorized pump (4) to the food/hydration additives pod housing assembly (22). The bite valve (23) and user remote control (24) are shown attached to a bicycle handle bar. The user remote control (24) may be wired or wireless and controls the control module (5) in the pump assembly (3), see FIG. 2.

An embodiment of the kit meant for water consumption only comprises the pump assembly (3) as described above with the second output tube (9) serving as output of the water.

A water bottle or water bladder (34), sold by others and shown in FIG. 1, may be screwed to the pump assembly (3) using threads (2), as shown in FIG. 2, or connected to the pump assembly (3) using a quick connect/disconnect coupling (not shown) as is known by those skilled in the relevant art.

The food/hydration additives pod housing assembly (22) comprises the micro peristaltic pump (10), a receptacle configured to receive an additive container (16), a mixing chamber (15) embedded in the housing of the food/hydration additives pod housing assembly (22), additive suction tube (11), additive output tube (12) with an in-line check valve (13), a water, second output tube (9) with an in-line check valve (14) and the mix, first output tube (21), see FIG. 2. As also shown in FIG. 2, the additive container (16) may be a pod comprising, for example, a plastic body fitted with a foil base (17), a foil top cover (20), a semi sticky rubber ring (19) and a concentrated liquefied food/hydration additive. The concentrated liquefied food/hydration additive may be selected by the user.

Turning back to FIG. 3, the pump assembly (3) and the food/hydration additives pod housing assembly (22) are mounted on the bicycle frame utilizing braces (26) and the water, second output tube (9) connects the pump assembly (3) and the food/hydration additives pod housing assembly (22), only a portion of which is visible in FIG. 3. Instead of braces (26), any other securing mechanism or means for securing the pump assembly (3) and the food/hydration additives pod housing assembly (22) to a portion of the bicycle frame known to those skilled in the art to which this invention pertains may be used in the invention.

A first container is configured to be removably connected to the pump assembly (3). Specifically, a first bottle or bladder (34) may be connected to the pump assembly (3) using threads (2) as shown in FIG. 2, or a quick connect/disconnect coupling, or any other connecting technique known to those skilled in the art to which this invention pertains. An optional second container, e.g., a bottle or bladder, may be mounted to the bicycle frame, e.g., to the vertical frame member. The second suction tube (8) is placed into second container connecting it with pump assembly (3). The first, mix output tube (21) is inserted into the food/hydration additives pod housing assembly (22) and secured to the bicycle frame by braces (25). Instead of braces (25), any other securing mechanism or means for securing the first, mix output tube (21) to a portion of the bicycle frame known to those skilled in the art to which this invention pertains may be used in the invention.

An electronically controlled or bite controlled valve (23) is connected to the first, mix output tube (21). A bicycle-mounted wireless control pad (24) is mounted onto the bicycle bar or alternatively a hand held smart phone (not shown) is utilized as a wireless controller pad by installing an application on said smart phone.

Figure 4:
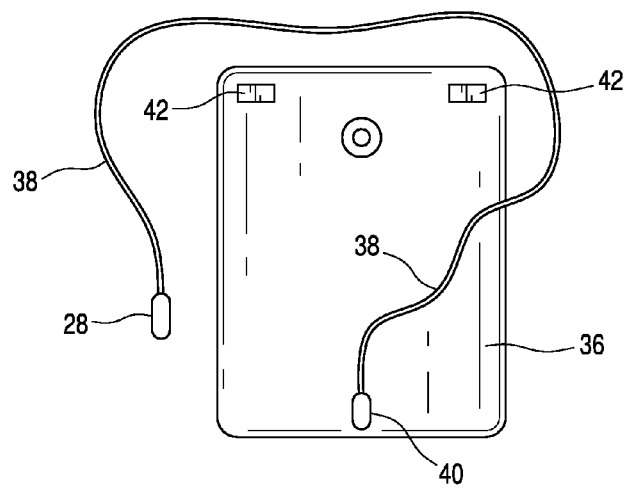
FIG. 4 is a front view of a prior art backpack or waist pack hydration bladder.

Turning now to FIG. 4, a prior art hydration bladder (36) may be modified to work with a motorized kit (32) of the present invention as follows. The bladder (36) may include hanging notches (42).

Figure 5:
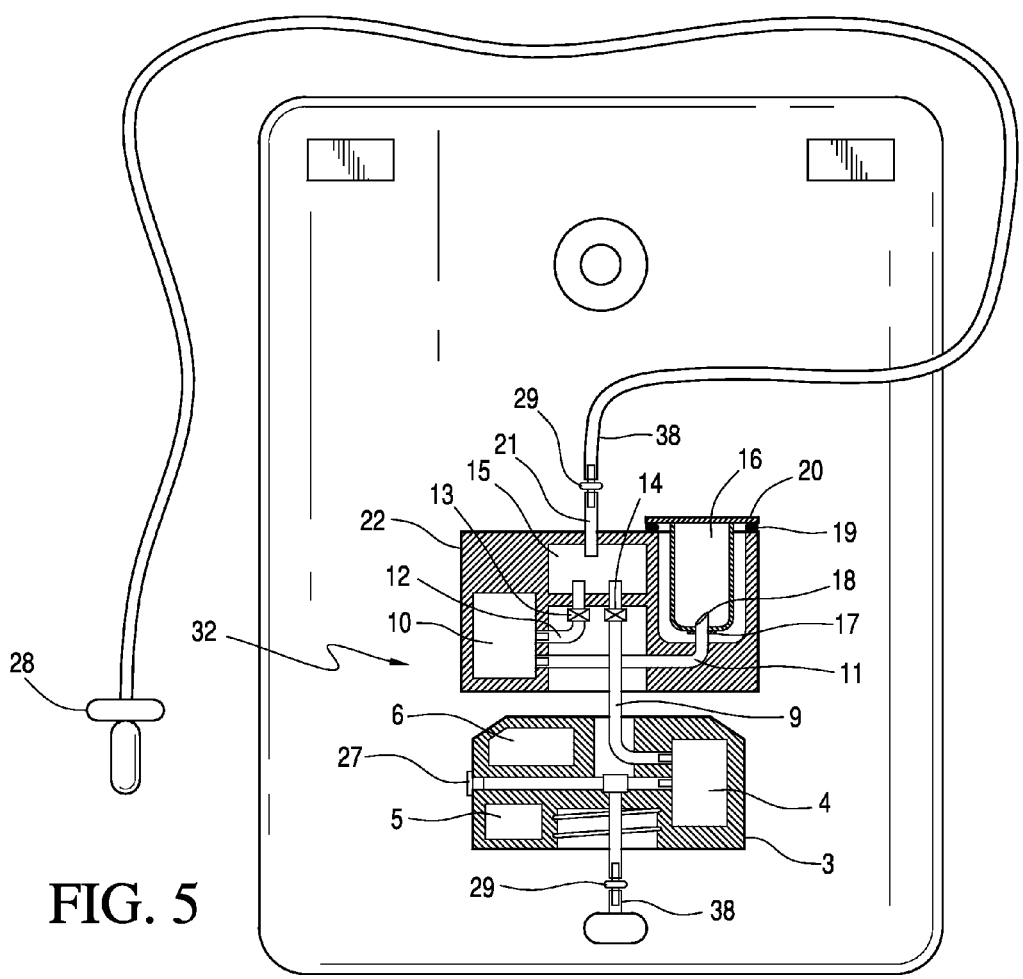
FIG. 5 is a backpack or waist pack embodiment of the present invention.

An existing bladder tube (38) is cut about 0.5" above the bottom of the existing fitting (40), creating a top cut end of the existing tube and a bottom cut end of the existing tube (38). As shown in FIG. 5, a top kit tube fitting and a bottom kit tube fitting (29) are inserted into the top cut end of the existing tube (38) and the bottom cut end of the existing tube (38), respectively. A modified version of the pump assembly (3), where the diverter (7) is eliminated and a plug (27) blocks the second suction port through which second suction tube (8) would pass, is connected to the bottom tube fitting (29) and the food/hydration additives pod housing assembly (22) is coupled to the top tube fitting (29), i.e., the first outlet tube (21) is placed into flow communication with the top tube fitting (29).

Next, the motorized kit may be secured to the bladder (36) by any means, including but not limited to, hook-and-loop fasteners, snaps and/or adhesives. This embodiment of the invention therefore generally includes a securing mechanism or means for securing the motorized kit comprising the pump assembly (3) and the food/hydration additives pod housing assembly (22) to an existing bladder, which securing mechanism or means may be any known to those skilled in the art to which this invention pertains.

The kit is operated by a user wired switch (28) installed next to the bite valve or by a wireless remote control (24) carried by the user or smart phone carried by the user by installing an application on said smart phone. Another embodiment includes a modified bite valve configured to electronically control the control module (5).

In operation, the power source (6) provides power, command and control to micro vane or diaphragm motorized pump (4) and micro peristaltic pump (10) through the control module (5) as well as to the diverter (7), the bicycle-mounted wireless control pad (24), a wireless electronically control bite valve (28) and alternatively provides command and control to a handheld smart phone (not shown) utilized as a wireless controller pad.

When a user desires to use the hydration system, the bottle(s) and/or bladders are filled with water and connected to the pump assembly (3) and an additive pod (16) is inserted into the food/hydration additives pod housing assembly (22). When the food/hydration additives pod housing assembly (22) is closed, in a manner known to those skilled in the art of pods, the sharp pointed tip (18) penetrates the bottom foil base (17) of the pod (16) making the liquefied concentrate food/hydration additive ready for suction by the micro peristaltic pump (10). The user may select just water or a mix of water and the food/hydration additive by operating the controls of the hydration system, either by directly operating the control module (5) or by operating the user remote control (24) which controls control module (5). Specifically, when water is selected, control module (5) will operate only the micro vane pump (4) (or micro diaphragm pump (4)), water will be sucked out of the bottle through first suction tube (1) and pumped out to the user through the first output tube (21). If the first container is empty and the optional second container is connected, the control module (5) will reposition the diverter (7) to point towards the second bottle and second suction tube (8) will be utilized while the first suction tube (1) will be plugged by the diverter (7).

When a mix of water and food/hydration is selected by the user, control module (5) simultaneously operates both micro vane pump (4) (or micro diaphragm pump (4)) and micro peristaltic pump (10) causing both water and additive from additive pod (16) to be pumped into the mixing chamber (15) in programmed quantities to create a suitable mixture of water and additive that is then delivered to the user via output tube (21).

While the foregoing written description of the invention enables one of ordinary skill to make and use what is considered presently to be the best mode thereof, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the appended claims.

What is claimed is:

1. A hydration system, comprising:
    a pump assembly comprising
        a pump housing;
        a first suction tube extending outward from said pump housing and adapted to fluidly connect to a first receptacle holding a liquid;
        an attachment means for attaching said pump housing to said first receptacle;
        a first output tube extending outward from said pump housing;
        a power source arranged in said pump housing;
        an activatable pump arranged in said pump housing, said pump being connected to said first suction tube and said first output tube and configured to draw liquid from said first suction tube and propel the drawn liquid through said first output tube when activated and connected to and powered by said power source; and
        a control module for activating and deactivating said pump; and
    a user control for controlling said control module.

2. The hydration system of claim 1, wherein said user control is selected from a group consisting of a wired remote control, a wireless remote control, a smart phone and a smart phone with an application for operating the hydration system installed thereon.

3. A hydration system, comprising:
    a pump assembly comprising
        a pump housing;
        a first suction tube extending outward from said pump housing and adapted to fluidly connect to a first receptacle holding a liquid;
        a second suction tube extending transversely outward from said pump housing and adapted to fluidly connect to a second receptacle holding a liquid;
        a first output tube extending outward from said pump housing;
        a power source arranged in said pump housing;
        an activatable pump arranged in said pump housing, said pump being connected to said first suction tube and said first output tube and configured to draw liquid from said first suction tube and propel the drawn liquid through said first output tube when activated and connected to and powered by said power source; and
        a control module for activating and deactivating said pump;
        a diverter arranged in said pump housing connected to said first and second suction tubes, said diverter having a first position and a second position, wherein said pump draws liquid from said first suction tube when the diverter is in the first position and said pump draws liquid from said second suction tube when the diverter is in the second position,
        wherein said diverter is connected to and controlled by said control module to selectively change between the first position and second position; and
    a user control for controlling said control module.

4. A hydration system, comprising:
    a pump assembly comprising
        a pump housing;
        a first suction tube extending outward from said pump housing and adapted to fluidly connect to a first receptacle holding a liquid;
        a first output tube extending outward from said pump housing;
        a power source arranged in said pump housing;
        an activatable pump arranged in said pump housing, said pump being connected to said first suction tube and said first output tube and configured to draw liquid from said first suction tube and propel the drawn liquid through said first output tube when activated and connected to and powered by said power source;
        an additive assembly connected to said first output tube, said additive assembly comprising:
            an additive assembly housing defining a mixing chamber, said first output tube fluidly communication with said mixing chamber;
            an additive receptacle disposed inside said additive assembly housing and configured to receive a container including one or more additives;
            a second output tube in fluid communication with said mixing chamber;
            an activatable additive pump disposed in said additive assembly housing;
            an additive suction tube in fluid communication with said additive receptacle; and
            an additive output tube in fluid communication with said mixing chamber,
            said additive pump being connected to said power source and configured to draw the one or more additives from said additive receptacle through said additive suction tube and propel the drawn one or more additives through said additive output tube to said mixing chamber, draw liquid from said first output tube and propel the drawn liquid into said mixing chamber when activated and propel a mixture of liquid and one or more additives from said mixing chamber through said second output tube; and
        a control module for activating and deactivating said pump and activating and deactivating said additive pump; and
    a user control for controlling said control module.

5. The hydration system of claim 4, wherein said additive suction tube has a rigid or semi-rigid point adapted to pierce the container when received in said additive reservoir.

6. The hydration system of claim 4, wherein said additive assembly housing includes an aperture configured to enable access to said additive receptacle for placement and removal of a container including one or more additives.

7. The hydration system of claim 4, wherein said additive assembly further comprises:
   a first inline check valve arranged in said first output tube to prevent back pressure to the pump; and
   a second inline check valve arranged in said additive output tube to prevent back pressure to the pump.

8. A hydration system conversion kit for use with a fluid container structure having a hydration system tube leading from a receptacle to an outlet, comprising:
   a pump assembly comprising
      a pump housing;
      a first suction tube extending outward from said pump housing and adapted to fluidly connect to a first tube fitting;
      a first output tube extending outward from said pump housing;
      a power source arranged in said pump housing;
      an activatable pump arranged in said pump housing, said pump being connected to said first suction tube and said first output tube and configured to draw liquid from said first suction tube and propel the drawn liquid through said first output tube when activated and connected to and powered by said power source; and
      a control module for activating and deactivating said pump; and
   a user control for controlling said control module,
   wherein said first tube fitting is configured to attach to an open end of the hydration system tube to thereby enable fluid in the receptacle of the fluid container structure to be drawn by said pump.

9. The hydration system conversion kit of claim 8, further comprising an additive assembly connected to said first output tube, said additive assembly comprising:
   an additive assembly housing defining a mixing chamber, said first output tube in fluid communication with said mixing chamber;
   an additive receptacle disposed inside said additive assembly housing and configured to receive a container including one or more additives;
   a second output tube in fluid communication with said mixing chamber and adapted to fluidly connect to a second tube fitting;
   an activatable additive pump disposed in said additive assembly housing;
   an additive suction tube in fluid communication with said additive receptacle; and
   an additive output tube in fluid communication with said mixing chamber,
   said additive pump being connected to said power source and said control module and configured to draw the one or more additives from said additive receptacle through said additive suction tube and propel the drawn one or more additives through said additive output tube to said mixing chamber, draw liquid from said first output tube and propel the drawn liquid into said mixing chamber when activated and propel a mixture of liquid and one or more additives from said mixing chamber through said second output tube, and
   wherein said control module is configured to activate or deactivate said additive pump and said second tube fitting is configured to attached to another open end of the hydration system tube to thereby enable fluid in the receptacle of the fluid container structure to be drawn by said pump and said additive pump to the hydration system outlet.

10. The hydration system conversion kit of claim 9, wherein said additive suction tube has a rigid or semi-rigid point adapted to pierce the container when received in said additive receptacle.

11. The hydration system conversion kit of claim 9, wherein said additive assembly housing includes an aperture configured to enable access to said additive receptacle for placement and removal of a container including one or more additives.

12. The hydration system conversion kit of claim 9, wherein said additive assembly further comprises:
   a first inline check valve arranged in said first output tube to prevent back pressure to the pump; and
   a second inline check valve arranged in said additive output tube to prevent back pressure to the pump.

13. A method of converting a hydration system, having a fluid container structure having a tube leading from a receptacle receivable of a fluid to an outlet, into a powered hydration system, comprising the steps of:
   cutting said tube to form a first tube stem and a second tube stem, said first tube stem having a receptacle end connected to said receptacle and a cut end and said second tube stem having an outlet end connected to said outlet and a cut end;
   forming a first tube fitting by connecting said cut end of said first tube stem to a first tube connector;
   forming a second tube fitting by connecting said cut end of said second tube stem to a second tube connector; and
   connecting said first tube fitting and said second tube fitting to a pump assembly comprising:
      a pump housing;
      a first suction tube extending outward from said pump housing and adapted to fluidly connect to said first tube fitting;
      a first output tube extending outward from said pump housing and adapted to fluidly connect to said second tube fitting;
      a power source arranged in said pump housing;
      an activatable pump arranged in said pump housing, said pump being connected to said first suction tube and said first output tube and configured to draw liquid from said first suction tube and propel the drawn liquid through said first output tube when activated and connected to and powered by said power source; and
      a control module for activating and deactivating said pump.

14. The method of claim 13, further comprising attaching said pump housing to the receptacle.

15. The method of claim 13, further comprising fluidly connecting a second suction tube extending transversely outward from said pump housing to another receptacle holding a liquid, the pump assembly further including a diverter arranged in said pump housing connected to said first and second suction tubes, the method further comprising:
   controlling said diverter by means of said control module to move said diverter between a first position and a second position, wherein said pump draws liquid from said first suction tube when the diverter is in the first position and said pump draws liquid from said second suction tube when the diverter is in the second position.

16. The method of claim 13, wherein said user control is selected from a group consisting of a wired remote control, a wireless remote control, a smart phone and a smart phone with an application for operating the hydration system installed thereon.

17. A method of converting a hydration system, having a fluid container structure having a tube leading from a receptacle to an outlet, into a powered hydration system, comprising the steps of:
cutting said tube to form a first tube stem and a second tube stem, said first tube stem having a receptacle end connected to said receptacle and a cut end and said second tube stem having an outlet end connected to said outlet and a cut end;
forming a first tube fitting by connecting said cut end of said first tube stem to a first tube connector;
forming a second tube fitting by connecting said cut end of said second tube stem to a second tube connector; and
connecting said first tube fitting and said second tube fitting to a pump assembly comprising:
a pump housing;
a first suction tube extending outward from said pump housing and adapted to fluidly connect to said first tube fitting;
a first output tube extending outward from said pump housing;
a power source arranged in said pump housing;
an activatable pump arranged in said pump housing, said pump being connected to said first suction tube and said first output tube and configured to draw liquid from said first suction tube and propel the drawn liquid through said first output tube when activated and connected to and powered by said power source;
an additive assembly housing defining a mixing chamber, said first output tube in fluid communication with said mixing chamber;
an additive receptacle disposed inside said additive assembly housing and configured to receive a container including one or more additives;
a second output tube in fluid communication with said mixing chamber and adapted to fluidly connect to said second tube fitting;
an activatable additive pump disposed in said additive assembly housing;
an additive suction tube in fluid communication with said additive receptacle; and
an additive output tube in fluid communication with said mixing chamber,
said additive pump being connected to said power source and said control module and configured to draw the one or more additives from said additive receptacle through said additive suction tube and propel the drawn one or more additives through said additive output tube to said mixing chamber, draw liquid from said first output tube and propel the drawn liquid into said mixing chamber when activated and propel a mixture of liquid and one or more additives from said mixing chamber through said second output tube, and
a control module for activating and deactivating said pump and said additive pump.

18. The method of claim 17, further comprising attaching said pump housing to the receptacle.

19. The method of claim 17, further comprising fluidly connecting a second suction tube extending transversely outward from said pump housing to another receptacle holding a liquid, the pump assembly further including a diverter arranged in said pump housing connected to said first and second suction tubes, the method further comprising:
controlling said diverter by means of said control module to move said diverter between a first position and a second position, wherein said pump draws liquid from said first suction tube when the diverter is in the first position and said pump draws liquid from said second suction tube when the diverter is in the second position.

20. The method of claim 17, wherein said user control is selected from a group consisting of a wired remote control, a wireless remote control, a smart phone and a smart phone with an application for operating the hydration system installed thereon.

* * * * *